(No Model.)  2 Sheets—Sheet 1.

T. MORRISSEY & J. DOYLE.
STEAM HAND CAR.

No. 400,409.  Patented Mar. 26, 1889.

Witnesses:
P. M. Hulbert
J. Paul Mayer

Inventors:
John Doyle
Timothy Morrissey
By Thos. S. Sprague & Son Att'y.

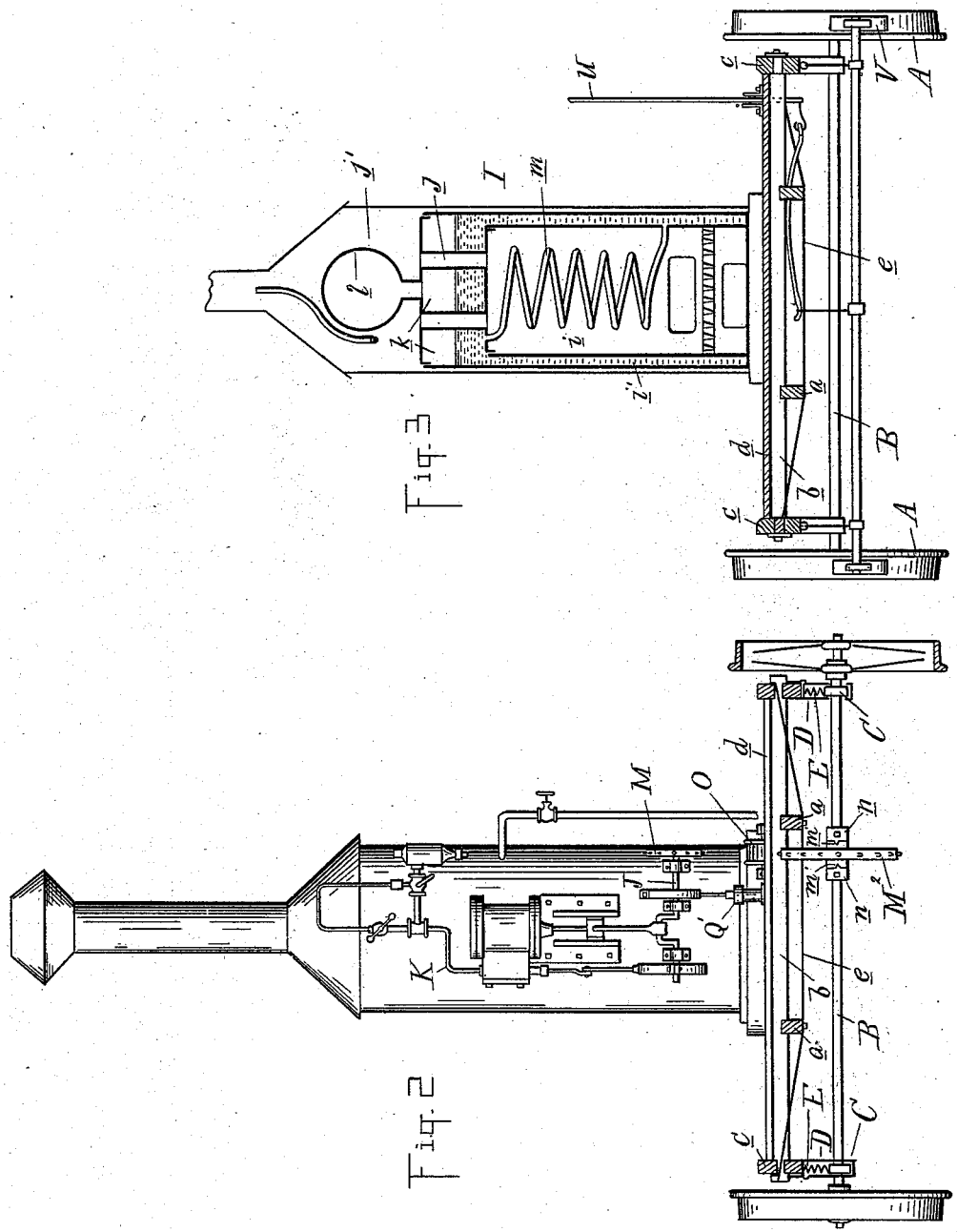

UNITED STATES PATENT OFFICE.

TIMOTHY MORRISSEY AND JOHN DOYLE, OF IONIA, MICHIGAN.

STEAM HAND-CAR.

SPECIFICATION forming part of Letters Patent No. 400,409, dated March 26, 1889.

Application filed January 14, 1889. Serial No. 296,357. (No model.)

*To all whom it may concern:*

Be it known that we, TIMOTHY MORRISSEY and JOHN DOYLE, citizens of the United States, residing at Ionia, in the county of Ionia and State of Michigan, have invented certain new and useful Improvements in Steam Hand-Cars, of which the following is a specification, reference being had therein to the accompanying drawings.

This invention relates to new and useful improvements in steam hand-cars; and the invention consists in the peculiar construction, arrangement, and combination of different parts, all as more fully hereinafter described, and shown in the accompanying drawings, in which—

Figure 1:
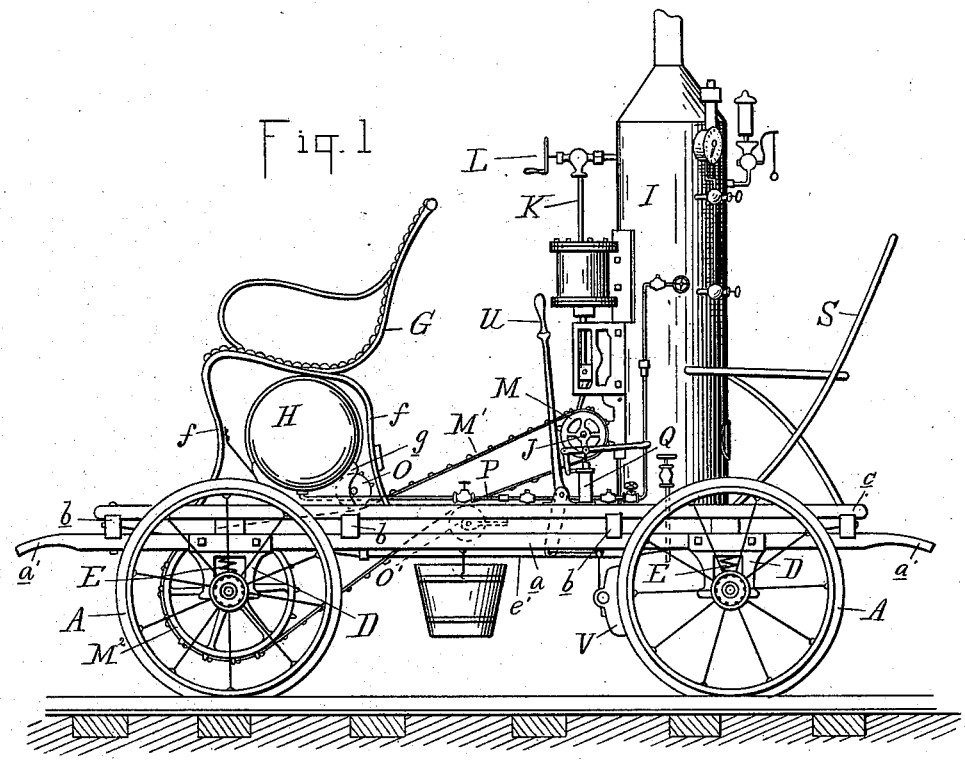
Figure 4:
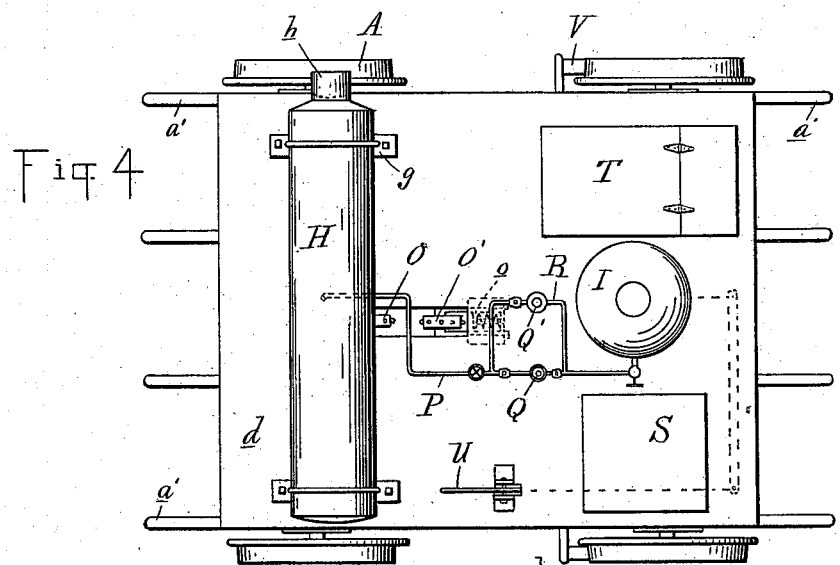

Figure 1 is a side elevation of my device. Fig. 2 is a front elevation thereof, partly in section, to show the construction of the platform and truck. Fig. 3 is a similar cross-section in front of the rear trucks, and Fig. 4 is a plan.

A are the four wheels of the car, and which are of the kind ordinarily used in the construction of hand-cars, or of any other suitable construction in which strength and lightness are combined.

B are the axles on which the wheels are mounted, and C are the axle-boxes in which the axles are journaled, and these boxes are vertically-slidingly secured in cast-iron pedestals D, pendent from the side timbers of the platform.

E are the springs between the platform and axle-boxes to support the platform thereon.

F is a platform, preferably constructed of a series of longitudinal bed-timbers, $a$, placed at intervals apart and projecting in front and rear to form the handles $a'$. Upon these bed-timbers are secured the transverse timbers $b$, placed at intervals apart from front to rear and gained into the bed-timbers.

$c$ are two longitudinal timbers upon the ends of the transverse timbers $b$ and bolted through into the bed-timbers, and $d$ is a flooring laid on the transverse timbers, all securely fastened and bolted together and strengthened by transverse truss-rods $e$ and longitudinal truss-rods $e'$, the construction of the whole platform aiming at great strength combined with lightness.

Upon the front part of the platform and transversely thereof is mounted a light seat, G, securely bolted to the platform by suitable rods or braces, $f$, there being enough room left upon the platform in front of the seat for a convenient foot-rest. The room underneath the seat is unobstructed for the purpose of disposing in such space of the water-tank H, which is preferably of cylindrical shape, extending from side to side, and is secured upon saddles $g$, which are bolted to the platform and to which the water-tank is firmly secured in any suitable manner. One end of the water-tank is provided with a covered fill-opening, $h$, in which is a strainer to strain the water before it enters the tank.

Upon the rear end of the platform, and in the center thereof, or nearly so, is placed the boiler which furnishes the motive power. This boiler I is what is called an "upright" boiler, and its construction affords great facility for raising steam quickly.

In the construction shown in the drawings, $i$ is the furnace-chamber within the boiler, having an annular water-space, $i'$, surrounding it, and communicating by a series of smoke-flues, $j$, with the smoke-jacket $j'$ on top of the boiler. Within this smoke-jacket a cylindrical steam-dome, $l$, is placed, which communicates with the steam-space $k$ of the boiler, and from which the steam is taken in dry condition. A water-circulation within the boiler is obtained by a large pipe-coil, $m$, which connects the annular water-chamber near the bottom thereof with a point near the top of the boiler in such a manner as to be exposed to the greatest amount of heat within the fire-chamber.

The whole boiler is inclosed in an outside jacket to prevent loss from radiation, and is surmounted by a smoke-stack of suitable height to promote a draft, and the exhaust from the engine is conducted into it to increase the draft, as in the usual manner. The boiler is provided with all the necessary accompaniments for its safe and convenient operation. The engine operates in a vertical position with its crank-shaft J transversely to the platform and at a little distance above the same, the whole engine being mounted upon a bed-plate, which is securely fastened upon the front side of the boiler and connected by the steam-supply pipe K, having a suitable throttle-valve, L, with the steam-dome of the boiler.

Upon the crank-shaft of the engine is secured a sprocket-wheel, M, over which the drive-chain M' passes. This drive-chain passes through a slot in the platform and around the sprocket-wheel M², which is secured upon the front axle between the collars n, which are fastened by set-screws upon the axle, and have studs m' entering notches on the hub of the sprocket-wheel. An idler, O, secured on top of the platform, guides the upper run of the chain, and a sprocket-pinion, O', secured below the platform, guides the lower branch chain. The latter sprocket-pinion serves as a tightener to compensate for the spring-support on the front axle by being engaged in sliding bearings, and is backed by a spring, o, the tension of which keeps the chain tightened.

From the under side of the water-tank a feed-pipe, P, placed upon the platform, conducts the feed-water to the hand-pump Q and farther into the boiler, and in a branch, R, around said hand-pump is placed the steam-pump Q', which is actuated by suitable connection with the crank-shaft.

To one side of the boiler is placed a seat, S, for the engineer, and all the appurtenances for operating the boiler, engine, and pump are placed in suitable proximity thereto. On the opposite side of the boiler is placed a suitable large coal-bunker, T, preferably constructed of sheet metal, and with a compartment for keeping therein the necessary tools.

In front of the engineer's seat is placed the brake-lever U, which by means of suitable connection underneath the platform actuates the brake V.

The construction of an entirely practical steam hand-car for use on railroads has still remained an unsolved problem on account of the difficulty of constructing such a car within the allowable weight for removing it from the rails at any emergency arising from the approach of a train, as it is well known that hand-cars take their own risk in avoiding trains, and if there are, as is often the case, but two persons riding upon the car it is obvious that the weight of the car cannot be increased beyond what two men are able to lift from the rails to meet certain emergencies.

By the judicious construction and arrangement of the different parts of the device we have succeeded in constructing a car which comes within the limit of weight to meet the requirements demanded by the circumstances. With the increased responsibilities placed at the present day upon the road-masters and those in charge of the track the increased facilities afforded by a practical steam hand-car able to run at a considerable speed—say twelve miles an hour at an average for a considerable distance—will be greatly appreciated and found to be an important improvement, the advent of which has long been desired, and which could never be obtained by the hand-cars in present use on all roads and which rely exclusively upon manual power.

We are aware that it is not new to construct a steam-propelled carriage, nor do we claim any improvements in the construction of steam generators or motors; but

What we claim as our invention is—

1. In a steam hand-car, the combination, with the platform and car, of the generator I, supported on the rear end thereof, the engine mounted on the front side thereof and having its crank-shaft J in proximity to the platform, the sprocket-wheel M, mounted on said shaft, the sprocket-wheel M², mounted on the front axle of the car, the drive-chain M', and the idlers O and O', the latter having a yielding connection with the platform, substantially as described.

2. The combination, with a car provided with a platform, F, constructed substantially as described and mounted on springs E, of the seat G, supported on the front end of said car, the water-tank H, secured under said seat, the boiler I, mounted on the rear end of the car, the engine mounted upon the front side of the boiler and with its crank-shaft in proximity to the platform of the car, the sprocket-wheel M, mounted on said shaft, the sprocket-wheel M², mounted on the front axle of the car, the drive-chain M', the fixed idler O, and the idler O', secured in sliding bearings and provided with the spring o, substantially as described.

In testimony whereof we affix our signatures, in presence of two witnesses, this 13th day of December, 1888.

TIMOTHY MORRISSEY.
JOHN DOYLE.

Witnesses:
B. F. CALVIN,
HARRISON P. GROVER.